United States Patent
Hakola et al.

(10) Patent No.: US 12,245,242 B2
(45) Date of Patent: Mar. 4, 2025

(54) DYNAMIC SCHEDULING OFFSET ADAPTATION IN UE POWER SAVING

(71) Applicant: Nokia Technologies Oy, Espoo (FI)

(72) Inventors: Sami-Jukka Hakola, Kempele (FI); Jorma Johannes Kaikkonen, Oulu (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 492 days.

(21) Appl. No.: 17/607,258

(22) PCT Filed: Apr. 30, 2020

(86) PCT No.: PCT/EP2020/062060
§ 371 (c)(1),
(2) Date: Oct. 28, 2021

(87) PCT Pub. No.: WO2020/225100
PCT Pub. Date: Nov. 12, 2020

(65) Prior Publication Data
US 2022/0232611 A1  Jul. 21, 2022

Related U.S. Application Data

(60) Provisional application No. 62/842,923, filed on May 3, 2019.

(51) Int. Cl.
*H04W 72/23* (2023.01)
*H04W 52/02* (2009.01)

(52) U.S. Cl.
CPC ....... *H04W 72/23* (2023.01); *H04W 52/0229* (2013.01)

(58) Field of Classification Search
None
See application file for complete search history.

(56) References Cited

U.S. PATENT DOCUMENTS

2020/0107345 A1* 4/2020 Ang .................. H04L 5/0094
2022/0159700 A1* 5/2022 Maleki .............. H04W 72/23

OTHER PUBLICATIONS

3GPP TSG RAN WG1 Meeting #96-Bis, Xi'an, China, Apr. 8-12, 2019, R1-1905869, MediaTek Inc., "Summary#2 of Offline on Cross-Slot Scheduling", 18 pgs.

(Continued)

*Primary Examiner* — German Viana Di Prisco
(74) *Attorney, Agent, or Firm* — McCarter & English, LLP (57) ABSTRACT

A method and apparatus for dynamically adapting scheduling parameter(s) to achieve power savings. A user equipment may be configured with one or more offsets between scheduled PDCCH and PDSCH transmissions. The user equipment may receive from a network an indication to dynamically change these offsets. If the user equipment sleeps through a first transmission of this indication, upon next receiving the indication the user equipment may update, for example, the offset in a time domain resource allocation table. The indication to dynamically change an offset may be an indication of an offset including fewer slots. A change to the offset, with which downlink transmission is expected by the user equipment, may be disabled. A network node may be configured to transmit downlink traffic to the user equipment according to a configured offset and/or according to an offset the network node indicated to the user equipment.

40 Claims, 4 Drawing Sheets

(56) References Cited

OTHER PUBLICATIONS

3GPP TSG RAN WG1 Meeting #96-Bis, Xi'an, China, Apr. 8-12, 2019, R1-1905819, MediaTek Inc., "Summary of Offline on Cross-Slot Scheduling", 12 pgs.
3GPP TSG RAN WG1 Meeting #96-Bis, Xi'an, China, Apr. 8-12, 2019, R1-1905819, MediaTek Inc., "Summary#2 of Offline on Cross-Slot Scheduling", 18 pgs.
3GPP TSG RAN WG1 Meeting #97, Reno, USA, May 13-17, 2019, R1-1906372, Spreadtrum Communications, "Discussion on cross-slot scheduling for UE power saving", 7 pgs.
3GPP TSG RAN WG1 meeting #97, Reno, USA, May 13-17, 2019, R1-1907376, Nokia, Nokia Shanghai Bell, "Procedure of cross-slot scheduling power saving techniques", 5 pgs.
Huawei et al. "HARQ Feedback Timing for NR" 3GPP Draft: R1-1706961 3rd Generation Partnership Project May 8, 2017.

* cited by examiner

FIG. 1

PDSCH Time Domain Resource Allocation Table 200

| Index | PDSCH Mapping Type | K0/SLIV/start symbol S and allocation length L |
|---|---|---|
| m + 1 | ... | K0 = 0 |
| m + 2 | ... | K0 = 1 |
| ... | ... | K0 = 2 |

201 → Index
202 → PDSCH Mapping Type
203 → K0/SLIV/start symbol S and allocation length L

DYNAMIC SCHEDULING OFFSET ADAPTATION IN UE POWER SAVING

CROSS REFERENCE TO RELATED APPLICATION

This patent application is a U.S. National Stage application of International Patent Application Number PCT/EP2020/062060 filed Apr. 30, 2020, which is hereby incorporated by reference in its entirety, and claims priority to U.S. provisional application 62/842,923 filed May 3, 2019, which is hereby incorporated by reference in its entirety.

BACKGROUND

Technical Field

The example and non-limiting embodiments relate generally to communications and, more particularly, to dynamically adapting scheduling parameter(s) to achieve power savings.

Brief Description of Prior Developments

It is known, for a user equipment in a radio resource control connected state, to receive resource scheduling information via physical downlink control channel.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
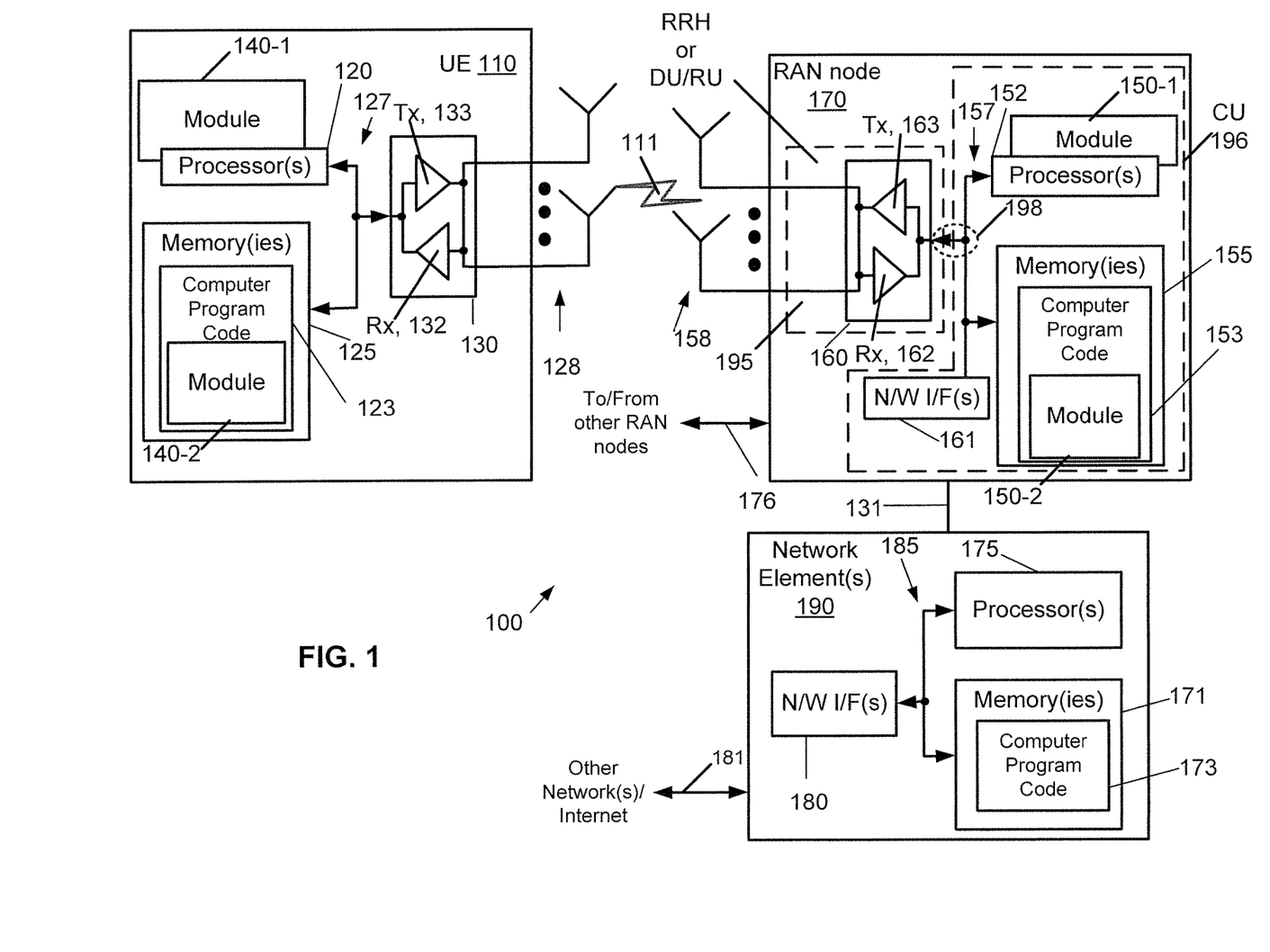
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BWP bandwidth part
CU central unit
CSI-RS channel state information reference signal
DCI downlink control information
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
L1 layer 1
L long term evolution
MAC medium access control
MME mobility management entity
ng or NG new generation
ng-eNB or NG-eNB new generation eNB
NR new radio
N/W or NW network
NZP non-zero power
PDCP packet data convergence protocol
PDCCH physical downlink control channel
PDSCH physical downlink shared channel
PUSCH physical uplink shared channel
PHY physical layer
QCL quasi co-location
RAN radio access network
RF radio frequency
RLC radio link control
RS reference signal
RRH remote radio head
RRC radio resource control
RU radio unit
Rx receiver
SDAP service data adaptation protocol
SGW serving gateway
SLIV start and length indicator
SMF session management function
SRS sounding reference signal
TDRA time domain resource assignment
TS technical specification
Tx transmitter
UE user equipment (e.g., a wireless, typically mobile device)
UL uplink
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 3:
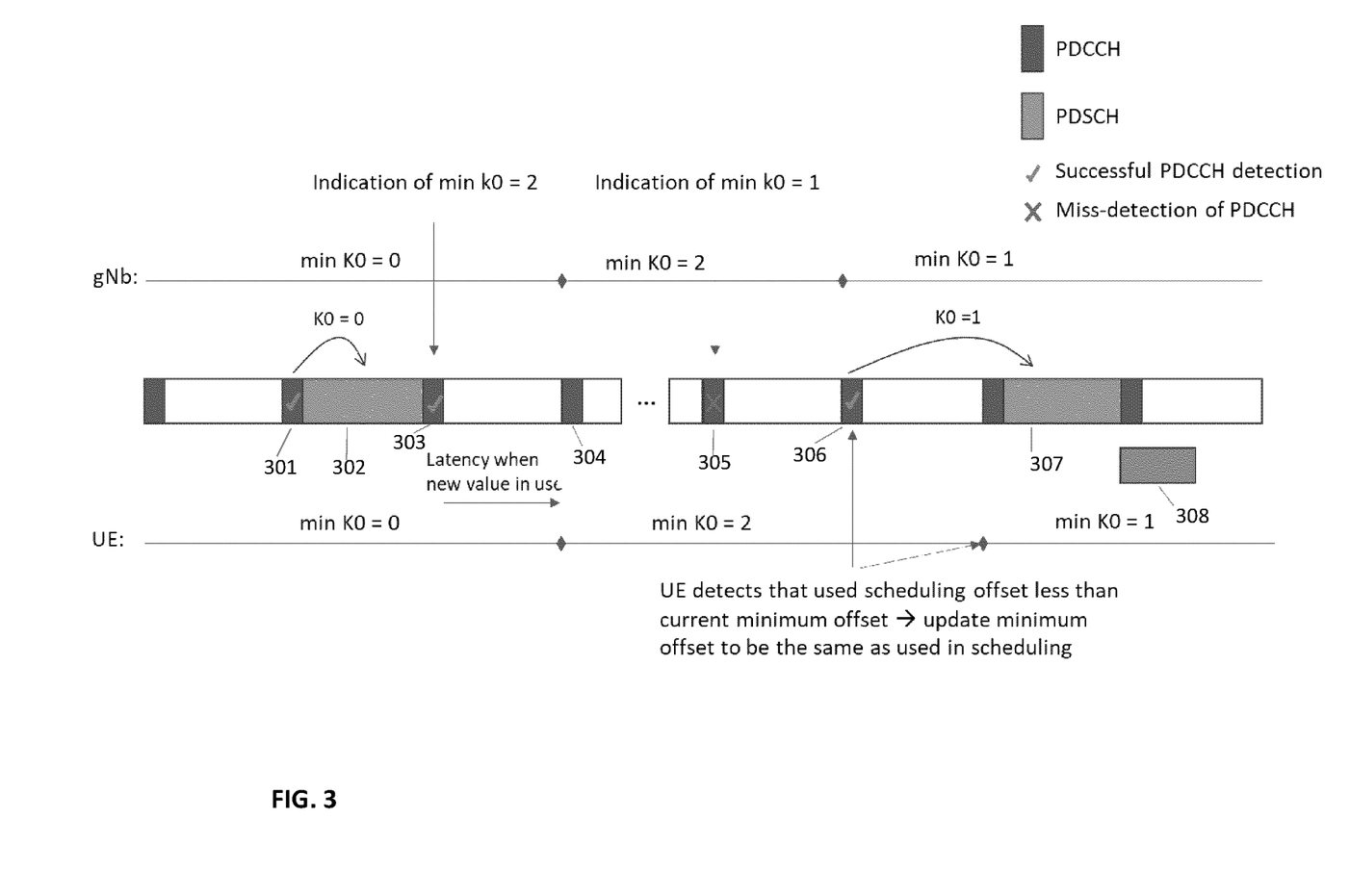
FIG. 3 is a diagram illustrating features as described herein.

The UE 110 may be in an RRC_CONNECTED mode, as illustrated for example in FIG. 3. The PDCCH-based power saving signal/channel may be used to trigger UE 110 adaptation while the UE 110 is in RRC_CONNECTED mode. One of the adaptation procedures may be dynamic switching between same-slot and cross-slot scheduling, for example the Rel-15 cross-slot scheduling procedure, where cross-slot scheduling would provide UE 110 with the possibility for micro-sleep after PDCCH occasion in the slot (PDCCH occasion is assumed to be in the beginning of the slot).

In NR, for scheduling, UE 110 may be configured with, at least, a list of PDSCH-TimeDomainResourceAllocation entries, a list of PUSCH-TimeDomainResourceAllocation entries, aperiodicTriggeringOffset, and slotOffset for aperiodic SRS.

The list of PDSCH-TimeDomainResourceAllocation entries may be used to configure a time domain relation between PDCCH and PDSCH where one parameter per entry is K0, determining a slot offset between scheduling DCI and scheduled PDSCH. See, for example, FIG. 2.

The list of PUSCH-TimeDomainResourceAllocation entries may be used to configure a time domain relation between PDCCH and PUSCH where one parameter per entry is K2, determining a slot offset between scheduling DCI and scheduled PUSCH.

The aperiodicTriggeringOffset may be used to indicate an offset between the slot containing the DCI that triggers a set of aperiodic NZP CSI-RS resources and the slot in which the CSI-RS resource set is transmitted.

The slotOffset for aperiodic SRS may indicate an offset between the slot triggering DCI and the slot in which actual transmission of the SRS-ResourceSet occurs.

Figure 2:
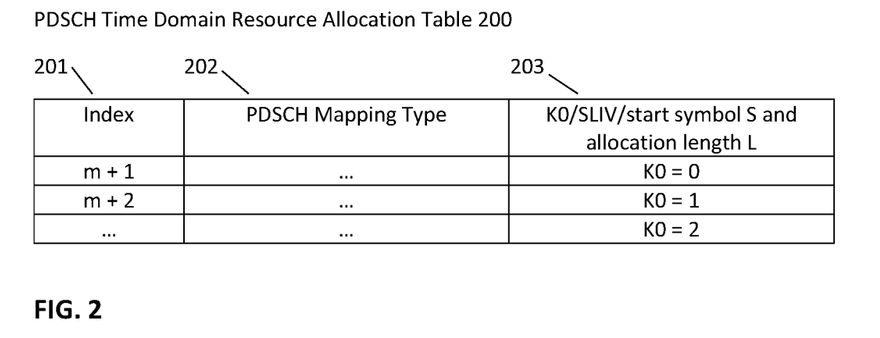
FIG. 2 is a table illustrating features as described herein.

Referring now to FIG. 2, when the UE 110 is scheduled to receive PDSCH, the time domain resource assignment field value m of the scheduling DCI provides a row index, 201, m+1 to an allocation table 200. The indexed row defines the slot offset K0, the start and length indicator SLIV (dedicated table in use), or directly the start symbol S and the allocation length L (default table in use), 203, and the PDSCH mapping type 202 to be assumed in the PDSCH reception. While FIG. 2 illustrates K0 values, it should be understood that values for SLIV and/or S and L may be included; the illustration of K0 values in FIG. 2 is not meant to limit the scope of this disclosure.

To enable micro-sleep, and thus power saving, UE 110 should be able to assume that PDCCH does not schedule any downlink or uplink transmission to the same slot. In other words, the UE 110 should be able to assume that minimum K0 value (slot offset between scheduling PDCCH and PDSCH) is greater than zero in terms of number of slots; aperiodic CSI-RS triggering slot offset is greater than zero in terms of number of slots (aperiodicTriggeringOffset); minimum K2 value (slot offset between scheduling PDCCH and PUSCH) is greater than zero in terms of number of slots; and a delay between PDCCH and triggered aperiodic SRS (slotOffset) is greater than zero in terms of number of slots.

It should be noted that the values illustrated in FIG. 2 are not intended to limit the scope of this disclosure. While FIG. 2 illustrates a table with values for K0, it should be understood that a UE may also or alternatively be configured with a table, which may be similar to FIG. 2, comprising a list of PUSCH-TimeDomainResourceAllocation entries, including values for K2.

In one option to facilitate dynamic adaptation between same-slot and cross-slot scheduling, the UE 110 may be configured with, for example, two sets of time domain resource allocation tables for PDSCH (with K0 values), two sets of time domain resource allocation tables for PUSCH (with K2 values) and two sets of aperiodic CSI-RS triggering slot offset values. gNB 170 can then dynamically select the set to be applied for each of PDSCH scheduling, PUSCH scheduling, and/or aperiodic CSI-RS. This option results in higher signaling and configuration overhead.

In another option to facilitate dynamic adaptation between same-slot and cross-slot scheduling, the gNB 170 may dynamically indicate a minimum downlink scheduling offset that is to be applied for PDSCH scheduling and A-CSI-RS (aperiodic channel state information reference signal) and a minimum uplink scheduling offset that is to be applied for PUSCH scheduling and A-SRS (aperiodic sounding reference signal). gNB 170 indicated minimum scheduling offset(s) would replace earlier configured values known by the UE 110 that are lower than the new indicated offset. Note that there may be a common minimum offset for both downlink and uplink, or separate minimum offsets for downlink and uplink, respectively.

The two previously listed options are still considered as possible candidates for defining the cross-slot scheduling related power saving functionality as per agreements made in RAN1 #96bis, including:

1) For an active DL and an active UL BWP, a UE 110 can be indicated via signaling(s) from gNB 170 to adapt the minimum applicable value(s) of K0, K2, and/or aperiodic CSI-RS triggering offset (with/without QCL typeD configured), where the signaling type is to be down-selected from MAC-CE based or L1 based. It is not yet clear how to determine the minimum applicable offset value(s) if an explicit value is not provided.

2) Possible candidate indication methods to adapt the minimum applicable value of K0 (or K2) for an active DL (or UL) BWP, where the indication method may be one of: an indication of a subset of TDRA entries, e.g., bit-map based indication; an indication of one active table from multiple configured TDRA tables; or an indication of the minimum applicable value. Other indication methods may be available. PDCCH monitoring case 1-1 is prioritized for this agreement, i.e. so that PDCCH monitoring is assumed to occur in first symbols, e.g. tree, of the slot. It is not yet clear whether and how the minimum applicable K0 (or K2) value of the active DL (or UL) BWP is also applied to cross-BWP scheduling.

3) Possible candidate indication methods to adapt the minimum applicable value of the aperiodic CSI-RS triggering offset for an active DL BWP, where the indication method may be one of: implicit indication by defining the minimum applicable value as the same as the minimum applicable K0 value when indicated, or indication of the minimum applicable value. Other indication methods may be available. PDCCH monitoring case 1-1 is prioritized for this agreement.

The issue with conventional solutions to facilitating dynamic adaptation between same-slot and cross-slot scheduling is that they do not take into account the fact that, since the PDCCH is not protected with a retransmission mechanism, any error events in the detection of PDCCH-based power saving channel may cause unexpected behaviors, at gNB 170, UE 110, and/or both. Therefore, a mechanism for handling the miss-detection event may be needed. In the case of PDCCH-based scheduling parameter adaptation (signaling of new minimum offset for instance or activation of configured offset), miss-detection of PDCCH would lead to un-synchronization between gNB 170 and UE 110 about the used time domain resource allocation entries for PDSCH, PUSCH, A-CSI-RS and A-SRS. In other words, the UE 110 would interpret wrongly the given time domain resource allocation command in DL/UL grant for DL/UL transmission, leading to DL reception/UL transmission failures and a waste of radio resources.

One solution to this problem of erroneous detection of PDCCH-based power saving channel may be a validity timer, where given minimum scheduling offsets would be valid for the certain time duration. While the timer-based implicit mechanism can help recovery from the misdetection event of power saving channels, it involves latency during which the UE 110 may unnecessarily waste power.

Another solution to this problem of erroneous detection of PDCCH-based power saving channel may be similar to SPS PDSCH release command, in that a PDCCH-based power saving signal could have a HARQ ACK feedback that is used to indicate to the gNB 170 whether or not UE 110 received the command regarding adaptation of the minimum scheduling offset(s). A group-based DCI may also be used to adapt scheduling parameters for a group of UEs 110, with one DCI to limit signaling overhead. However, it may be challenging to provide HARQ resources for the set of UEs targeted with the group/common PDCCH.

Solution(s) for error handling for the possible miss-detection of power saving channel to update the minimum scheduling offset may result in greater power efficiency.

The following considers a common minimum scheduling offset but in general there could be separate minimum scheduling offset for each of DL and UL.

In an example embodiment, assuming that the UE 110 is configured with a time domain resource allocation table for DL and UL transmissions in RRC with slot offset entries allowing same-slot and cross-slot scheduling (i.e. possible slot offsets are zero and non-zero, meaning UE 110 cannot perform micro-sleep according to RRC configuration), for example FIG. 2, a UE 110 and gNB 170 may be subject to behavior and rules to enable UE 110 to determine miss-detection of the DCI command to update scheduling parameters as well as to recover from the miss-detection.

gNB 170 may only schedule DL/UL transmission with a slot offset (number of slots between scheduling DCI and scheduled DL/UL transmission) that is equal to or greater than a maximum of a RRC configured minimum value (i.e. configured K0, CSI-RS triggering offset in DL and/or K2, SRS triggering offset in UL) and a dynamically indicated minimum scheduling offset. For example, gNB 170 may only use TDRA table entries that have K0 equal or larger than the indicated minimum offset for PDSCH scheduling.

UE 110 may, upon reception of PDCCH, determine from the scheduling grant (either DL or UL) that the indicated time resource (for PDSCH, CSI-RS, PUSCH or SRS) has a smaller offset (time between scheduling PDCCH and indicated time resource) than the current minimum scheduling offset enabled/received via L1 signaling to the UE 110. For instance, in case of PDSCH scheduling, the UE 110 may miss the scheduled transmission with K0=0 (after miss-detection of L1 command to have minimum scheduling offset being 0) if it is using a minimum scheduling offset greater than 0 because it goes to micro-sleep after reception of PDCCH symbols according to an earlier indicated minimum scheduling offset. To recover from the missed adaptation order of the scheduling offset, the UE 110 updates the current minimum scheduling offset to correspond to the time offset indicated by the scheduling grant (either DL or UL).

In an example of a mechanism to recover from miss-detection of the PDCCH carrying update of the minimum scheduling offset, referring to FIG. 3, UE 110 successfully detects PDCCH 301 and determines a minimum scheduling offset K0=0 such that PDSCH 302 is scheduled in the next slot with no offset. UE 110 then successfully detects PDCCH 303 and determines a minimum scheduling offset K0=2.

UE 110 may, for example, micro-sleep while PDCCH 305 indicates a minimum scheduling offset K0=1 and fails to detect PDCCH 305. This constitutes a miss-detection of PDCCH 305. When UE 110 successfully detects PDCCH 306, the UE 110 may determine that the minimum scheduling offset indicated by PDCCH 306, K0=1, is smaller than the current minimum scheduling offset previously received by the UE 110, K0=2, from previous successful detection of PDCCH 303. To recover from the missed adaptation of the scheduling offset, the UE 110 updates the current minimum scheduling offset to correspond to the time offset indicated by PDCCH 306, K0=1, such that PDSCH 307 is scheduled at an offset K0=1. This mechanism to recover from miss-detection of the PDCCH carrying update of the minimum scheduling offset will allow UE 110 to anticipate PDSCH 207 and not PDSCH 208.

Figure 4:
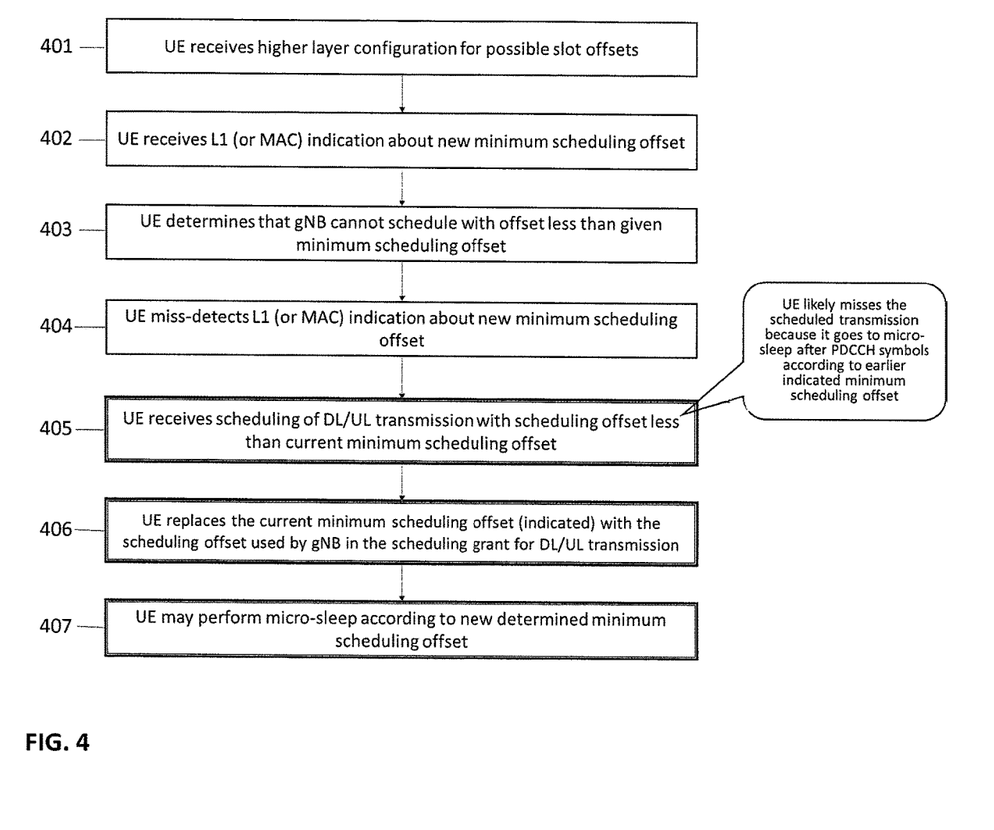
FIG. 4 is a flowchart illustrating steps as described herein.

FIG. 4 illustrates the potential steps of a UE 110 to detect miss-detection of scheduling parameters and update its current understanding of the minimum scheduling offset. A person of ordinary skill in the art will understand that these steps may occur in a different order, some steps may be omitted, and/or some steps may be performed concurrently. The UE 110 may receive higher layer configuration for possible slot offsets, 401. This may take the form of a table, i.e. a TDRA table, where the index defines the slot offset K0, the start and length indicator SLIV, or directly the start symbol S and the allocation length L, and the PDSCH mapping type to be assumed in the PDSCH reception. See FIG. 2. The UE 110 may then receive L1 (or MAC) indication about a new minimum scheduling offset, 402. The UE 110 may then determine that gNB 170 cannot schedule with an offset less than the given minimum scheduling offset, 403. In other words, the UE 110 may determine that it need not expect, for example, PDSCH, within the time represented by the given minimum scheduling offset. The UE 110 may then miss-detect a L1 (or MAC) indication about a new minimum scheduling offset, 404. The UE may then receive scheduling of DL/UL transmission with a scheduling offset less than the current minimum scheduling offset, 405. Note that the UE 110 likely misses one or more of earlier scheduled transmission(s) because it goes to micro-sleep after PDCCH symbols, according to an earlier indicated minimum scheduling offset. The UE 110 may then replace the current minimum scheduling offset (indicated) with the scheduling offset used by gNB 170 in the scheduling grant for DL/UL transmission, 406. The UE 110 may then perform micro-sleep according to the new determined minimum scheduling offset, 407.

In alternative example embodiments, a same mechanism for handling erroneous miss-detection could be applied also in case of UL scheduling (K2), CSI-RS triggering and SRS triggering.

There could also be a signaling method (L1, MAC, RRC) that deactivates the dynamically (L1 based) given minimum scheduling offset, and UE 110 would then assume only a RRC-configured set of potential scheduling offset values.

In one example embodiment, dynamically provided (DCI based) minimum scheduling offset(s) may be applied across all the serving cells, or on one serving cell only on which UE 110 does PDCCH monitoring while in a power saving state, where scheduling DL/UL transmission(s) on one or multiple serving cell(s) and/or SCell activation may disable the dynamically provided (DCI based) minimum scheduling offset(s).

In one example embodiment, there may be a time period during which UE does not need to expect more than one dynamic scheduling offset update (per scheduling offset parameter K0, K2, etc., or per DL and UL minimum scheduling offset, or per common DL and UL minimum scheduling offset), i.e., upon detection of a minimum scheduling offset parameter update, the UE 110 can assume that there will be no new dynamic update(s) coming within the given time period. This time period includes at least a scheduling parameter switching delay. The time period may be a UE 110 capability.

In alternative example embodiments, upon detection of a DL-scheduling DCI pointing to a TDRA allocation with a K0 (or K2) value smaller than the configured minimum scheduling offset, UE 110 may determine that the minimum scheduling offset is disabled and that forthcoming scheduling follows the scheduling offsets determined by the configured TDRA tables, i.e., scheduling offset relaxation may be disabled. Accordingly, the behavior and rules would only apply to gNB 170 if the scheduling offset relaxation for micro-sleeps is to be kept active.

Disabling dynamically provided minimum scheduling offset(s) may require that one or more of the following rules apply: a determination of beam failure and initiation of beam failure recovery may disable the dynamically provided minimum scheduling offset(s); a determination of radio link failure and initiation of radio link re-establishment may disable the dynamically provided minimum scheduling offset(s); a handover may disable the dynamically provided minimum scheduling offset(s) in the source cell, i.e. in a target cell, where the UE 110 starts with RRC configured values for scheduling offset(s); a BWP switch where the given TDRA value points to a value lower than the current dynamically provided minimum scheduling offset value may disable the dynamically provided minimum scheduling offset(s), where the dynamically provided minimum scheduling offset(s) are applied/disabled for scheduling after the minimum scheduling offset; an activation of an SCell may disable the dynamically provided minimum scheduling offset(s); a cross-carrier scheduling may disable the dynamically provided minimum scheduling offset(s), i.e. in a scenario where UE 110 monitors one serving cell while in a power saving state with dynamically provided (DCI based) minimum scheduling offset(s), if UE 110 receives cross-carrier scheduling command, the dynamically provided minimum scheduling offset(s) may be disabled.

In an example embodiment, there may be additional steps involved in implementing the disabling of the dynamically provided (DCI based) minimum scheduling offset(s): UE 110 may receive RRC configuration for TDRA; UE 110 may receive DCI-based indication about new minimum scheduling offset(s); UE 110 may determine/receive: beam failure, radio link failure, handover command, SCell activation, cross-carrier scheduling, and/or BWP switch (potentially with an explicit indication to disable the dynamically provided scheduling parameters or time domain allocation on new BWP, indicating lower value scheduling offset than current dynamically provided minimum scheduling offset (s)); and/or UE 110 may disable a previous dynamically provided minimum scheduling offset(s) and assume only higher layer (RRC) configured values. A person of ordinary skill in the art will understand that one, some, or all of these steps may occur in combination with the steps illustrated in FIG. 4, and that these steps may be performed concurrently with each other or with the steps illustrated in FIG. 4.

A technical effect of example embodiments of the invention is to affect a dynamic resource allocation parameter update mechanism. A technical effect of example embodiments of the invention is to achieve UE power savings, for example by enabling UE 110 micro-sleep. A technical effect of example embodiments of the invention is to address latency, performance, and network impact in 3GPP New Radio physical layer design. The invention may minimize the negative impact from miss-detecting L1 based dynamic minimum scheduling offset parameter update message.

In another alternative example implementation, gNB 170 may only schedule DL/UL transmission using the time domain resource assignment field value among the subset of TDRA entries (e.g. indicated by the bit-map).

UE 110 may, upon reception of PDCCH, determine from the DCI (either DL or UL) that a time domain resource assignment field value outside the subset of configured TDRA entries that had been enabled via L1 signaling to the UE 110 should be used. For instance, in case of PDSCH scheduling, the UE 110 may miss the scheduled transmission with K0=0 (after miss-detection of L1 command to disable the TDRA restriction based on, e.g., bitmap) if it is using a minimum scheduling offset greater than 0 because it goes to micro-sleep after reception of PDCCH symbols according to an earlier indicated minimum scheduling offset. To recover from the missed adaptation order of the TDRA table restriction, the UE 110 starts to use a fully configured TDRA table and disables the applied restriction to a subset of the TDRA entries.

In another alternative example implementation, UE 110 may update the subset of TDRA entries to include the indicated time domain resource assignment field value (either DL or UL). In addition or alternatively, UE 110 may update the subset of TDRA entries to include all the TDRA entries for which the scheduling offset is the same or larger than the scheduling offset indicated by the time domain resource assignment field value (either DL, UL, or both).

In another alternative example implementation, gNB 170 may only schedule DL/UL transmission from the active TDRA tables among the multiple configured TDRA tables, where the TDRA tables are configured so that they may have different numbers of rows, or so that not all rows are provided with valid TDRA configuration. In addition, one of the configured TDRA tables may be configured as a fallback TDRA table.

In another alternative example implementation, UE 110 may, upon reception of PDCCH, determine from the DCI (either DL or UL) that the time domain resource assignment field value is outside the valid values of the TDRA table activated to the UE 110. To recover from the missed adaptation order of the active TDRA table, the UE 110 starts to use an alternative TDRA table among the configured TDRA tables. The alternative TDRA table may for example be the configured fallback TDRA table or other configured TDRA table, or a TDRA table with lower (or higher) index among the configured TDRA tables.

In accordance with one aspect, an example method may be provided comprising: receiving, at a user equipment, a configuration for scheduling one or more transmissions with a network, where the configuration comprises a first minimum scheduling offset between receiving the configuration and at least one of the one or more transmissions; using the first minimum scheduling offset as a value of a current minimum scheduling offset; receiving, at the user equipment, an indication of a second minimum scheduling offset; determining that the second minimum scheduling offset is less than the current minimum scheduling offset; and replacing the value of the current minimum scheduling offset with the second minimum scheduling offset based, at least partially, on the determining.

The example method may further comprise: determining that the value of the current minimum scheduling offset is more than zero; and performing, at the user equipment, based on the determining that the value of the current minimum scheduling offset is more than zero, micro-sleep for a period of time during which the current minimum scheduling offset applies.

The example method may further comprise: receiving an indication that dynamic provision of minimum scheduling offset(s) should be disabled; and using, with the user equipment, the first minimum scheduling offset instead of the current minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

The receiving of the indication of a second minimum scheduling offset may comprise receiving at least one of: L1 signaling, or medium access control layer signaling.

The at least one of the one or more transmissions may comprise one of: a physical downlink shared channel transmission, a physical downlink control channel transmission, a channel state information reference signal, or a sounding reference signal.

The configuration for scheduling the one or more transmissions with the network may comprise at least one of: a slot offset between receipt of downlink control information and receipt of a physical downlink shared channel transmission, a slot offset between the receipt of the downlink control information and receipt of a physical uplink shared channel transmission, a slot offset between the receipt of the downlink control information and receipt of a channel state information reference signal, a slot offset between the receipt of the downlink control information and receipt of a sounding reference signal, or a time period during which an indication of a third minimum scheduling offset is not expected to be received following the receiving of the indication of the second minimum scheduling offset.

The user equipment may be in a radio resource control connected mode.

The first minimum scheduling offset, the current minimum scheduling offset, and the second minimum scheduling offset may comprise respective offsets from receipt of downlink control information.

In accordance with one example embodiment, an apparatus may be provided comprising: at least one processor; and at least one non-transitory memory including computer program code, the at least one non-transitory memory and the computer program code configured to, with the at least one processor, cause the apparatus to: receive a configuration for scheduling one or more transmissions with a network, where the configuration comprises a first minimum scheduling offset between receipt of the configuration and at least one of the one or more transmissions; use the first minimum scheduling offset as a value of a current minimum scheduling offset; receive an indication of a second minimum scheduling offset; determine that the second minimum scheduling offset is less than the current minimum scheduling offset; and replace the value of the current minimum scheduling offset with the second minimum scheduling offset based, at least partially, on the determination.

The example apparatus may be further configured to: determine that the value of the current minimum scheduling offset is more than zero; and perform, based on the determining that the value of the current minimum scheduling offset is more than zero, micro-sleep for a period of time during which the current minimum scheduling offset applies.

The example apparatus may be further configured to: receive an indication that dynamic provision of minimum scheduling offset(s) should be disabled; and use the first minimum scheduling offset instead of the current minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

Receiving the indication of a second minimum scheduling offset may comprise receiving at least one of: L1 signaling, or medium access control layer signaling.

The at least one of the one or more transmissions may comprise one of: a physical downlink shared channel transmission, a physical downlink control channel transmission, a channel state information reference signal, or a sounding reference signal.

The configuration for scheduling the one or more transmissions with the network may comprises at least one of: a slot offset between receipt of downlink control information and receipt of a physical downlink shared channel transmission, a slot offset between the receipt of the downlink control information and receipt of a physical uplink shared channel transmission, a slot offset between the receipt of the downlink control information and receipt of a channel state information reference signal, a slot offset between the receipt of the downlink control information and receipt of a sounding reference signal, or a time period during which an indication of a third minimum scheduling offset is not expected to be received following the receiving of the indication of the second minimum scheduling offset.

The example apparatus may be in a radio resource control connected mode.

The first minimum scheduling offset, the current minimum scheduling offset, and the second minimum scheduling offset may comprise respective offsets from receipt of downlink control information.

In accordance with another example embodiment, a non-transitory program storage device readable by a machine may be provided, tangibly embodying a program of instructions executable by the machine for performing operations, the operations comprising: receiving a configuration for scheduling one or more transmissions with a network, where the configuration comprises a first minimum scheduling offset between receiving the configuration and at least one of the one or more transmissions; using the first minimum scheduling offset as a value of a current minimum scheduling offset; receiving an indication of a second minimum scheduling offset; determining that the second minimum scheduling offset is less than the current minimum scheduling offset; and replacing the value of the current minimum scheduling offset with the second minimum scheduling offset based, at least partially, on the determining.

The example non-transitory program storage device may have operations further comprising: determining that the value of the current minimum scheduling offset is more than zero; and performing, based on the determining that the value of the current minimum scheduling offset is more than zero, micro-sleep for a period of time during which the current minimum scheduling offset applies.

The example non-transitory program storage device may have operations further comprising: receiving an indication that dynamic provision of minimum scheduling offset(s) should be disabled; and using the first minimum scheduling offset instead of the current minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

In accordance with one example embodiment, an apparatus may be provided comprising: means for receiving a configuration for scheduling one or more transmissions with a network, where the configuration comprises a first minimum scheduling offset between receiving the configuration and at least one of the one or more transmissions; means for using the first minimum scheduling offset as a value of a current minimum scheduling offset; means for receiving an indication of a second minimum scheduling offset; means for determining that the second minimum scheduling offset is less than the current minimum scheduling offset; and means for replacing the value of the current minimum scheduling offset with the second minimum scheduling offset based, at least partially, on the determining.

The example apparatus may further comprise: means for determining that the value of the current minimum scheduling offset is more than zero; and means for performing, based on the determining that the value of the current minimum scheduling offset is more than zero, micro-sleep for a period of time during which the current minimum scheduling offset applies.

The example apparatus may further comprise: means for receiving an indication that dynamic provision of minimum scheduling offset(s) should be disabled; and means for using the first minimum scheduling offset instead of the current minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

In accordance with one aspect, an example method may be provided comprising: sending, from a network node to a user equipment, a configuration for scheduling one or more transmissions, where the configuration comprises a first minimum scheduling offset between sending the configuration and at least one of the one or more transmissions; transmitting, to the user equipment, at least one transmission in accordance with the first minimum scheduling offset; sending, from the network node to the user equipment, a second minimum scheduling offset; and transmitting, to the user equipment, at least one transmission in accordance with the second minimum scheduling offset.

It may be that at least one of the first minimum scheduling offset or the second minimum scheduling offset is not zero.

The example method may further comprise: sending, to the user equipment, an indication that dynamic provision of minimum scheduling offset(s) should be disabled; and transmitting, to the user equipment, at least one transmission in accordance with the first minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

The sending of the second minimum scheduling offset may comprise use of at least one of: L1 signaling, or medium access control layer signaling.

At least one of the at least one transmission in accordance with the first minimum scheduling offset, or the at least one transmission in accordance with the second minimum scheduling offset, may comprise one of: a physical downlink shared channel transmission, a physical downlink control channel transmission, a channel state information reference signal, or a sounding reference signal.

The configuration for scheduling one or more transmissions may comprise at least one of: a slot offset between receipt of downlink control information and receipt of a physical downlink shared channel transmission, a slot offset between the receipt of the downlink control information and receipt of a physical uplink shared channel transmission, a slot offset between the receipt of the downlink control information and receipt of a channel state information reference signal, a slot offset between the receipt of the downlink control information and receipt of a sounding reference signal, or a time period during which a third minimum scheduling offset will not be sent, from the network node to the user equipment, following the sending of the second minimum scheduling offset.

In accordance with one example embodiment, an apparatus may be provided comprising: at least one processor; and at least one non-transitory memory including computer program code, the at least one non-transitory memory and the computer program code configured to, with the at least one processor, cause the apparatus to: send, to a user equipment, a configuration for scheduling one or more transmissions, where the configuration comprises a first minimum scheduling offset between sending the configuration and at least one of the one or more transmissions; transmit, to the user equipment, at least one transmission in accordance with the first minimum scheduling offset; send, to the user equipment, a second minimum scheduling offset; and transmit, to the user equipment, at least one transmission in accordance with the second minimum scheduling offset.

It may be that at least one of the first minimum scheduling offset or the second minimum scheduling offset is not zero.

The example apparatus may be further configured to: send, to the user equipment, an indication that dynamic provision of minimum scheduling offset(s) should be disabled; and transmit, to the user equipment, at least one transmission in accordance with the first minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

Sending the second minimum scheduling offset may comprise use of at least one of: L1 signaling, or medium access control layer signaling.

At least one of the at least one transmission in accordance with the first minimum scheduling offset, or the at least one transmission in accordance with the second minimum scheduling offset, may comprise one of: a physical downlink shared channel transmission, a physical downlink control channel transmission, a channel state information reference signal, or a sounding reference signal.

The configuration for scheduling one or more transmissions may comprise at least one of: a slot offset between receipt of downlink control information and receipt of a physical downlink shared channel transmission, a slot offset between the receipt of the downlink control information and receipt of a physical uplink shared channel transmission, a slot offset between the receipt of the downlink control information and receipt of a channel state information reference signal, a slot offset between the receipt of the downlink control information and receipt of a sounding reference signal, or a time period during which a third minimum scheduling offset will not be sent, from the network node to the user equipment, following the sending of the second minimum scheduling offset.

In accordance with another example embodiment, a non-transitory program storage device readable by a machine may be provided, tangibly embodying a program of instructions executable by the machine for performing operations, the operations comprising: sending, to a user equipment, a configuration for scheduling one or more transmissions, where the configuration comprises a first minimum scheduling offset between sending the configuration and at least one of the one or more transmissions; transmitting, to the user equipment, at least one transmission in accordance with the first minimum scheduling offset; sending, to the user equipment, a second minimum scheduling offset; and transmitting, to the user equipment, at least one transmission in accordance with the second minimum scheduling offset.

It may be that at least one of the first minimum scheduling offset or the second minimum scheduling offset is not zero.

The example non-transitory program storage device may have operations further comprising: sending, to the user equipment, an indication that dynamic provision of minimum scheduling offset(s) should be disabled; and transmitting, to the user equipment, at least one transmission in accordance with the first minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

In accordance with another example embodiment, an apparatus may be provided comprising: means for sending, to a user equipment, a configuration for scheduling one or more transmissions, where the configuration comprises a first minimum scheduling offset between sending the configuration and at least one of the one or more transmissions; means for transmitting, to the user equipment, at least one transmission in accordance with the first minimum scheduling offset; means for sending, to the user equipment, a second minimum scheduling offset; and means for transmitting, to the user equipment, at least one transmission in accordance with the second minimum scheduling offset.

It may be that at least one of the first minimum scheduling offset or the second minimum scheduling offset is not zero.

The example apparatus may further comprise: means for sending, to the user equipment, an indication that dynamic provision of minimum scheduling offset(s) should be disabled; and means for transmitting, to the user equipment, at least one transmission in accordance with the first minimum scheduling offset.

The indication that dynamic provision of minimum scheduling offset(s) should be disabled may comprise at least one of: a radio resource control configuration for a time domain resource assignment table; a downlink control information indication comprising information about new minimum scheduling offset(s); an indication of beam failure; an indication of radio link failure; a handover command; an indication of SCell activation; an indication of cross-carrier scheduling; or an indication of a bandwidth part switch.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   receiving, at a user equipment, a configuration for scheduling one or more transmissions with a network, wherein the configuration comprises a first minimum scheduling offset between receiving the configuration and at least one of the one or more transmissions;
   using the first minimum scheduling offset as a value of a current minimum scheduling offset;
   receiving, at the user equipment, an indication of a second minimum scheduling offset;
   determining that the second minimum scheduling offset is less than the current minimum scheduling offset; and
   using the second minimum scheduling offset as the value of the current minimum scheduling offset based, at least partially, on the determining.

2. The method of claim 1, further comprising:
   determining that the value of the current minimum scheduling offset is more than zero; and
   performing, at the user equipment, based on the determining that the value of the current minimum scheduling offset is more than zero, micro-sleep for a period of time during which the current minimum scheduling offset applies.

3. The method of claim 1, further comprising:
   receiving an indication that dynamic provision of minimum scheduling offset(s) should be disabled; and
   using, with the user equipment, the first minimum scheduling offset as the value of the current minimum scheduling offset based, at least partially, on the received indication.

4. The method of claim 3, wherein the indication that dynamic provision of minimum scheduling offset(s) should be disabled comprises at least one of:
   a radio resource control configuration for a time domain resource assignment table;
   a downlink control information indication comprising information about new minimum scheduling offset(s);
   an indication of beam failure;
   an indication of radio link failure;
   a handover command;
   an indication of secondary cell activation;
   an indication of cross-carrier scheduling; or
   an indication of a bandwidth part switch.

5. The method of claim 1, wherein the receiving of the indication of the second minimum scheduling offset comprises receiving at least one of:
   layer one signaling, or
   medium access control layer signaling.

6. The method of claim 1, wherein the at least one of the one or more transmissions comprises one of:
   a physical downlink shared channel transmission,
   a physical downlink control channel transmission,
   a channel state information reference signal, or
   a sounding reference signal.

7. The method of claim 1, wherein the configuration for scheduling the one or more transmissions with the network comprises at least one of:
   a slot offset between receipt of downlink control information and receipt of a physical downlink shared channel transmission,
   a slot offset between the receipt of the downlink control information and transmission of a physical uplink shared channel,
   a slot offset between the receipt of the downlink control information and receipt of a channel state information reference signal,
   a slot offset between the receipt of the downlink control information and transmission of a sounding reference signal, or
   a time period during which an indication of a third minimum scheduling offset is not expected to be received following the receiving of the indication of the second minimum scheduling offset.

8. The method of claim 1, wherein the user equipment is in a radio resource control connected mode.

9. The method of claim 1, wherein the first minimum scheduling offset, the current minimum scheduling offset, and the second minimum scheduling offset comprise respective offsets from receipt of downlink control information.

10. An apparatus comprising:
    at least one processor; and
    at least one memory storing instructions that, when executed by the at least one processor, cause the apparatus at least to:
       receive a configuration for scheduling one or more transmissions with a network, wherein the configuration comprises a first minimum scheduling offset between receipt of the configuration and at least one of the one or more transmissions;
       use the first minimum scheduling offset as a value of a current minimum scheduling offset;
       receive an indication of a second minimum scheduling offset;
       determine that the second minimum scheduling offset is less than the current minimum scheduling offset; and
       use the second minimum scheduling offset as the value of the current minimum scheduling offset based, at least partially, on the determining.

11. The apparatus of claim 10, wherein the at least one memory stores instructions that, when executed by the at least one processor, cause the apparatus to:
    determine that the value of the current minimum scheduling offset is more than zero; and
    perform, based on the determining that the value of the current minimum scheduling offset is more than zero, micro-sleep for a period of time during which the current minimum scheduling offset applies.

12. The apparatus of claim 10, wherein the at least one memory stores instructions that, when executed by the at least one processor, cause the apparatus to:
    receive an indication that dynamic provision of minimum scheduling offset(s) should be disabled; and
    use the first minimum scheduling offset as the value of the current minimum scheduling offset based, at least partially, on the received indication.

13. The apparatus of claim 12, wherein the indication that dynamic provision of minimum scheduling offset(s) should be disabled comprises at least one of:
    a radio resource control configuration for a time domain resource assignment table;
    a downlink control information indication comprising information about new minimum scheduling offset(s);
    an indication of beam failure;
    an indication of radio link failure;

a handover command;
an indication of secondary cell activation;
an indication of cross-carrier scheduling; or
an indication of a bandwidth part switch.

14. The apparatus of claim 10, wherein receiving the indication of the second minimum scheduling offset comprises receiving at least one of:
    layer one signaling, or
    medium access control layer signaling.

15. The apparatus of claim 10, wherein the at least one of the one or more transmissions comprises one of:
    a physical downlink shared channel transmission,
    a physical downlink control channel transmission,
    a channel state information reference signal, or
    a sounding reference signal.

16. The apparatus of claim 10, wherein the configuration for scheduling the one or more transmissions with the network comprises at least one of:
    a slot offset between receipt of downlink control information and receipt of a physical downlink shared channel transmission,
    a slot offset between the receipt of the downlink control information and transmission of a physical uplink shared channel,
    a slot offset between the receipt of the downlink control information and receipt of a channel state information reference signal,
    a slot offset between the receipt of the downlink control information and transmission of a sounding reference signal, or
    a time period during which an indication of a third minimum scheduling offset is not expected to be received following the receiving of the indication of the second minimum scheduling offset.

17. The apparatus of claim 10, wherein the apparatus is in a radio resource control connected mode.

18. The apparatus of claim 10, wherein the first minimum scheduling offset, the current minimum scheduling offset, and the second minimum scheduling offset comprise respective offsets from receipt of downlink control information.

19. A non-transitory computer-readable medium comprising program instructions stored thereon for performing at least the following:
    receiving a configuration for scheduling one or more transmissions with a network, wherein the configuration comprises a first minimum scheduling offset between receiving the configuration and at least one of the one or more transmissions;
    using the first minimum scheduling offset as a value of a current minimum scheduling offset;
    receiving an indication of a second minimum scheduling offset;
    determining that the second minimum scheduling offset is less than the current minimum scheduling offset; and
    using the second minimum scheduling offset as the value of the current minimum scheduling offset based, at least partially, on the determining.

20. The computer-readable medium of claim 19, further comprising program instructions stored thereon for performing:
    determining that the value of the current minimum scheduling offset is more than zero; and
    performing, based on the determining that the value of the current minimum scheduling offset is more than zero, micro-sleep for a period of time during which the current minimum scheduling offset applies.

21. The computer-readable medium of claim 19, further comprising program instructions stored thereon for performing:
    receiving an indication that dynamic provision of minimum scheduling offset(s) should be disabled; and
    using the first minimum scheduling offset as the value of the current minimum scheduling offset based, at least partially, on the received indication.

22. The computer-readable medium of claim 21, wherein the indication that dynamic provision of minimum scheduling offset(s) should be disabled comprises at least one of:
    a radio resource control configuration for a time domain resource assignment table;
    a downlink control information indication comprising information about new minimum scheduling offset(s);
    an indication of beam failure;
    an indication of radio link failure;
    a handover command;
    an indication of secondary cell activation;
    an indication of cross-carrier scheduling; or
    an indication of a bandwidth part switch.

23. A method comprising:
    transmitting, from a network node to a user equipment, a configuration for scheduling one or more transmissions, wherein the configuration comprises a first minimum scheduling offset between transmitting the configuration and at least one of the one or more transmissions;
    transmitting, to the user equipment, at least one transmission in accordance with the first minimum scheduling offset;
    transmitting, from the network node to the user equipment, a second minimum scheduling offset; and
    transmitting, to the user equipment, at least one transmission in accordance with the second minimum scheduling offset in response to the second minimum scheduling offset being less than the first minimum scheduling offset.

24. The method of claim 23, wherein at least one of the first minimum scheduling offset or the second minimum scheduling offset is not zero.

25. The method of claim 23, further comprising:
    transmitting, to the user equipment, an indication that dynamic provision of minimum scheduling offset(s) should be disabled; and
    transmitting, to the user equipment, at least one transmission in accordance with the first minimum scheduling offset.

26. The method of claim 25, wherein the indication that dynamic provision of minimum scheduling offset(s) should be disabled comprises at least one of:
    a radio resource control configuration for a time domain resource assignment table;
    a downlink control information indication comprising information about new minimum scheduling offset(s);
    an indication of beam failure;
    an indication of radio link failure;
    a handover command;
    an indication of secondary cell activation;
    an indication of cross-carrier scheduling; or
    an indication of a bandwidth part switch.

27. The method of claim 23, wherein the transmitting of the second minimum scheduling offset comprises use of at least one of:
    layer one signaling, or
    medium access control layer signaling.

28. The method of claim 23, wherein at least one of the at least one transmission transmitted in accordance with the first minimum scheduling offset, or the at least one transmission transmitted in accordance with the second minimum scheduling offset, comprises one of:
- a physical downlink shared channel transmission,
- a physical downlink control channel transmission,
- a channel state information reference signal, or
- a sounding reference signal.

29. The method of claim 23, wherein the configuration for scheduling the one or more transmissions comprises at least one of:
- a slot offset between receipt of downlink control information and receipt of a physical downlink shared channel transmission,
- a slot offset between the receipt of the downlink control information and transmission of a physical uplink shared channel,
- a slot offset between the receipt of the downlink control information and receipt of a channel state information reference signal,
- a slot offset between the receipt of the downlink control information and transmission of a sounding reference signal, or
- a time period during which a third minimum scheduling offset will not be sent, from the network node to the user equipment, following the transmitting of the second minimum scheduling offset.

30. An apparatus comprising:
at least one processor; and
at least one storing instructions that, when executed by the at least one processor, cause the apparatus at least to:
- transmit, to a user equipment, a configuration for scheduling one or more transmissions, wherein the configuration comprises a first minimum scheduling offset between transmitting the configuration and at least one of the one or more transmissions;
- transmit, to the user equipment, at least one transmission in accordance with the first minimum scheduling offset;
- transmit, to the user equipment, a second minimum scheduling offset; and
- transmit, to the user equipment, at least one transmission in accordance with the second minimum scheduling offset in response to the second minimum scheduling offset being less than the first minimum scheduling offset.

31. The apparatus of claim 30, wherein at least one of the first minimum scheduling offset or the second minimum scheduling offset is not zero.

32. The apparatus of claim 30, wherein the at least one memory stores instructions that, when executed by the at least one processor, cause the apparatus to:
- transmit, to the user equipment, an indication that dynamic provision of minimum scheduling offset(s) should be disabled; and
- transmit, to the user equipment, at least one transmission in accordance with the first minimum scheduling offset.

33. The apparatus of claim 32, wherein the indication that dynamic provision of minimum scheduling offset(s) should be disabled comprises at least one of:
- a radio resource control configuration for a time domain resource assignment table;
- a downlink control information indication comprising information about new minimum scheduling offset(s);
- an indication of beam failure;
- an indication of radio link failure;
- a handover command;
- an indication of secondary cell activation;
- an indication of cross-carrier scheduling; or
- an indication of a bandwidth part switch.

34. The apparatus of claim 30, wherein transmitting the second minimum scheduling offset comprises use of at least one of:
- layer one signaling, or
- medium access control layer signaling.

35. The apparatus of claim 30, wherein at least one of the at least one transmission transmitted in accordance with the first minimum scheduling offset, or the at least one transmission transmitted in accordance with the second scheduling offset, comprises one of:
- a physical downlink shared channel transmission,
- a physical downlink control channel transmission,
- a channel state information reference signal, or
- a sounding reference signal.

36. The apparatus of claim 30, wherein the configuration for scheduling the one or more transmissions comprises at least one of:
- a slot offset between receipt of downlink control information and receipt of a physical downlink shared channel transmission,
- a slot offset between the receipt of the downlink control information and receipt of a physical uplink shared channel transmission,
- a slot offset between the receipt of the downlink control information and receipt of a channel state information reference signal,
- a slot offset between the receipt of the downlink control information and receipt of a sounding reference signal, or
- a time period during which a third minimum scheduling offset will not be sent, from the network node to the user equipment, following the transmitting of the second minimum scheduling offset.

37. A non-transitory computer-readable medium comprising program instructions stored thereon for performing at least the following:
- transmitting, to a user equipment, a scheduling one or more configuration for transmissions, wherein the configuration comprises a first minimum scheduling offset between transmitting the configuration and at least one of the one or more transmissions;
- transmitting, to the user equipment, at least one transmission in accordance with the first minimum scheduling offset;
- transmitting, to the user equipment, a second minimum scheduling offset; and
- transmitting, to the user equipment, at least one transmission in accordance with the second minimum scheduling offset in response to the second minimum scheduling offset being less than the first minimum scheduling offset.

38. The computer-readable medium of claim 37, wherein at least one of the first minimum scheduling offset or the second minimum scheduling offset is not zero.

39. The computer-readable medium of claim 37, further comprising program instructions stored thereon for performing:
- transmitting, to the user equipment, an indication that dynamic provision of minimum scheduling offset(s) should be disabled; and
- transmitting, to the user equipment, at least one transmission in accordance with the first minimum scheduling offset.

40. The computer-readable medium of claim 39, wherein the indication that dynamic provision of minimum scheduling offset(s) should be disabled comprises at least one of:
- a radio resource control configuration for a time domain resource assignment table;
- a downlink control information indication comprising information about new minimum scheduling offset(s);
- an indication of beam failure;
- an indication of radio link failure;
- a handover command;
- an indication of secondary cell activation;
- an indication of cross-carrier scheduling; or an indication of a bandwidth part switch.

* * * * *